United States Patent [19]

McNulty et al.

[11] Patent Number: 4,868,755
[45] Date of Patent: Sep. 19, 1989

[54] EXPERT VEHICLE CONTROL SYSTEM

[75] Inventors: M. Christa McNulty, Dallas; Karl E. Schricker, Plano; Glenn H. Coleman, McKinney; Patricia L. Dutton, Allen; Garr S. Lystad, Dallas, all of Tex.

[73] Assignee: Texas Instruments Incorporated, Dallas, Tex.

[21] Appl. No.: 53,430

[22] Filed: May 18, 1987

[51] Int. Cl.$^4$ .............................................. G06F 15/50
[52] U.S. Cl. ............................... 364/434; 364/424.01; 364/513; 244/175
[58] Field of Search ............... 364/513, 424, 434, 439; 244/175, 195

[56] References Cited

U.S. PATENT DOCUMENTS 4,628,435 12/1986 Tashiro et al. ....................... 364/30
4,638,445 1/1987 Mattaboni ............................ 364/424
4,751,658 6/1988 Kadonoff et al. .................... 364/513

OTHER PUBLICATIONS

Hayes-Roth, "The Knowledge-Based Expert System: A Tutorial", 9/84, IEEE Compter, pp. 11-28.
Shah, "Potential Defense Applications of Expert Systems", 2/88, IEEE AES Magazine, pp. 15-19, (cited for interest).

Primary Examiner—Parshotam S. Lall
Assistant Examiner—Thomas G. Black
Attorney, Agent, or Firm—James T. Comfort; N. Rhys Merrett; Melvin Sharp

[57] ABSTRACT

An automatic control system for an aircraft has a first controller connected to the pilot's operating controls. The first controller manipulates the operating controls so that goals, expressed in terms of selected aircraft parameters, are achieved. A second controller supplies a series of goals to the first controller so that the aircraft will perform desired maneuvers. A third controller acts as a mission planner, and supplies desired maneuvers to the second controller in accordance with overall mission plans.

29 Claims, 2 Drawing Sheets

EXPERT VEHICLE CONTROL SYSTEM

The subject matter described herein was supported at least in part with funds provided under Department of Defense contract number F336-15-82-C-1841, and the U.S. Government has certain rights in this invention.

BACKGROUND AND SUMMARY OF THE INVENTION

The present invention relates generally to control of vehicles, and more specifically to automatic control of vehicles such as aircraft by an independently operating computer system.

Limited control of vehicles such as aircraft has been known for some time. For example, autopilots are available which can maintain the current characteristics of an aircraft such as heading, airspeed, and altitude. Some autopilots can perform certain simple changes such as changing altitude while maintaining course and airspeed. This is accomplished by setting the autopilot to a new value, in this example a new altitude, and allowing it to "correct" to the new value. The autopilot operates as if the aircraft had suddenly changed from a currently programmed altitude to a new one, and the autopilot were trying to return to the original altitude.

Autopilots operate by controlling the various control surfaces of an aircraft, such as the rudder, ailerons, and flaps. The engine's throttle is also controlled to provide airspeed control. The autopilot operates on a feedback mechanism which causes adjustments to be made to the appropriate controllable function in order to bring the actual operating parameters in line with those which currently exist. For example, if the airspeed is lower than the desired value, the autopilot increases the throttle. If the altitude is too low, the autopilot increases it, generally by raising the flaps slightly and increasing the throttle to keep airspeed constant. These feedback controls are very simple in nature, and are hardwired into the autopilot.

The feedback controls used in standard autopilots are simple enough that they could be wired in an analog controllers, and this has in fact been done in the past. At the present time, however, digital computers are used to provide the desired control functions. These onboard computers monitor the current value of several variables which indicate the status of the aircraft, and signal changes in the appropriate aircraft controls when any of these variables change from the desired values. The nature of the changes are relatively simple, and are determined in advance for a particular aircraft design. Thus, all aircraft having the same design utilize the same programs for effectuating the autopilot functions.

The number of maneuvers which can be performed by current autopilot systems is extremely limited. They are capable of flying civilian or military aircraft under normal conditions and static plans. For example, if a pilot desired to continue straight and level flight for an extended period of time, an autopilot is the ideal tool, so long as unusual atmospheric conditions are not encountered. Simple, slow turns and altitude changes can be made by changing the appropriate settings on an autopilot. But difficult maneuvers, such as aerobatic maneuvers, are not possible using current automatic controllers.

It would be desirable for an automatic control system for vehicles such as aircraft to be able to undertake maneuvers which are much more complex than those just described. It would be desirable for these control systems to be under the constant control of the pilot under normal circumstances, but for them to be capable of independent operation in unusual situations, such as pilot incapacitation on military aircraft. It would be further desirable that the degree of independence of the automatic control systems be easily adjusted by the pilot.

In order to accomplish these and other objects, an expert vehicle control system suitable for use in vehicles such as aircraft provides several layers of control of the vehicle. A lowest level monitors the current state of the vehicle, and changes the appropriate vehicle controls to bring the vehicle to match selected goals. A higher level determines a series of intermediate goals which can be used to cause the lowest level controller to implement desired maneuvers. A decision-making level can be used to determine the appropriate maneuvers to be implemented in accordance with known conditions, such as mission plans.

The novel features which characterize the present invention are defined by the claims. The foregoing and other objects and advantages of the present invention will hereafter appear, and for purposes of illustration, but not of limitation, a preferred embodiment is described in conjunction with the drawings.

DESCRIPTION OF THE PREFERRED EMBODIMENT

The present invention will be described as used with an automatic control to assist the pilot of a military fighter aircraft. As will be appreciated by those skilled in the art, the principles described below may be used in control systems for other types of vehicles.

Figure 1:
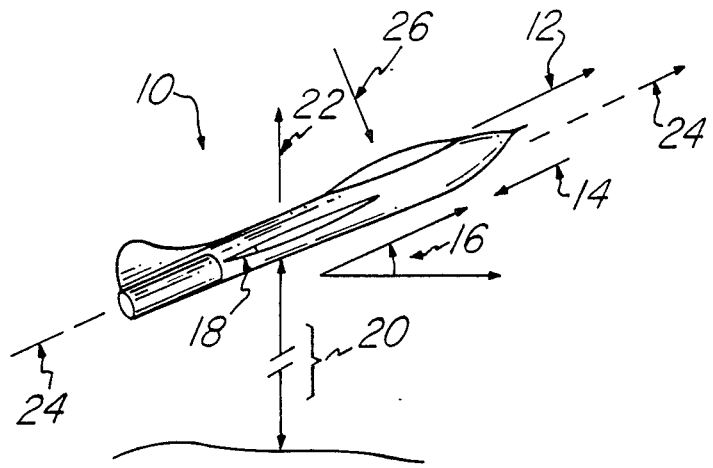
FIG. 1 is a simplified diagram of a jet aircraft in flight, illustrating several features relevant to the present invention.

FIG. 1 shows a simplified diagram of an aircraft 10 in flight. Operating parameters relevant to most maneuvers are illustrated therein. The aircraft has an airspeed, which is determined along the forward axis of flight 12. Airspeed is controlled directly by changing the throttle setting of the aircraft 10. Airspeed is also affected by other considerations, such as the current pitch of the aircraft 10. For example, an aircraft in a vertical dive will generally gain airspeed regardless of the throttle setting.

Angle of attack is a parameter which indicates how the pitch of the aircraft 10 is changing relative to the airstream 14 which it encounters. Angle of attack is related to the pitch of the aircraft 10, but they are not identical. Pitch indicates the angle 16 which the aircraft 10 makes with the horizon, with a value of zero indicating level flight. The angle of attack indicates whether the aircraft 10 is changing pitch, and in which direction. If the aircraft 10 is heading directly into the airflow it encounters, it has an angle-of-attack of 0 degrees. An aircraft can have a pitch of 0 degrees, indicating it is currently level, and an angle of attack of 10 degrees, indicating the nose is climbing relative to the rest of the aircraft. This would be the situation, for example, at the bottom of a multiple loop. On the other hand, the aircraft could have a pitch of 10 degrees, indicating a climb, and an angle of attack of 0 degrees, indicating it will continue to climb at 10 degrees. Angle of attack is changed by operating the flaps 18 of the aircraft shown 10, or the elevators on some types of aircraft (not shown).

The altitude 20 indicates the height of the aircraft 10, and is generally given as a height above sea level rather than height above the ground. This prevents the altitude indicator from constantly changing when the aircraft passes over irregular terrain, and is more easily implemented than sensing the aircraft's height above ground. The vertical velocity 22 of the aircraft 10 indicates movement in a vertical direction, and is positive during a climb. Vertical velocity 22 indicates the rate of change of altitude 20, and is the first derivative with respect to time of the altitude function.

The bank parameter indicates the relative position of a line passing through the wings and the horizon. When this parameter is zero, the aircraft 10 is level, except for any pitch which may exist. Changing the bank causes the aircraft 10 to roll around an axis 24 passing front to back through its geometric center.

The heading indicates the direction the aircraft 10 is moving relative to the Earth. This is usually indicated as a magnetic compass direction, although inertial detection is usually used in military aircraft.

G-forces are experienced by the pilot in a direction approximately parallel with his spine when he is sitting in the cockpit of the aircraft 10, as shown by arrow 26. These forces are created when the aircraft 10 rotates around an axis which is parallel to the wings and passes through the center of gravity of the aircraft 10. Such rotation is caused by raising the flaps 18. G-forces are also experienced when the aircraft 10 rises or descends. They may be positive or negative. High g-forces typically occur during loops and tightly banked turns.

Figure 2:
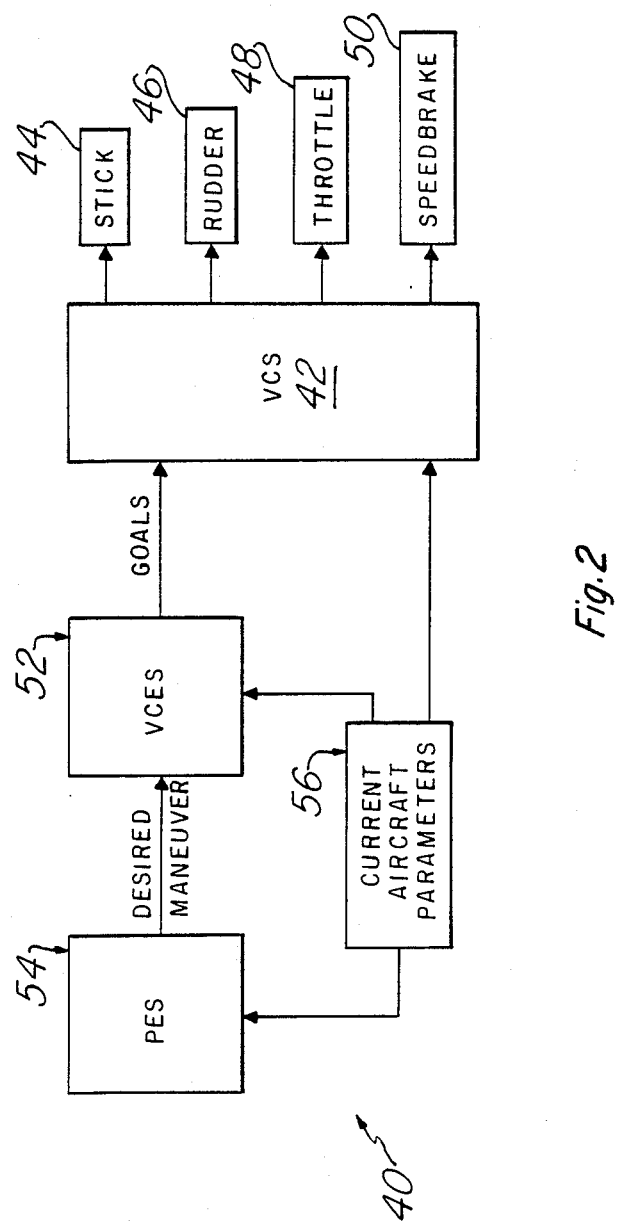
FIG. 2 is a block diagram of a control system for an aircraft according to the present invention.

FIG. 2 illustrates a vehicle control system 40 which is capable of controlling the aircraft during extremely complex maneuvers. The portion of the system which directly manipulates the normal aircraft controls is the vehicle control system 42 (VCS). The VCS performs generally the same functions as a sophisticated autopilot. Given a set of desired flight characteristics, such as angle of attack and airspeed, the VCS will change the aircraft controls so that its parameters match the desired ones. The desired parameters are referred to as goals, and the VCS constantly operates to ensure that the aircraft meets these goals. Goals may be individually enabled and disabled, so that for example, the VCS will keep the altitude and heading constant, but ignore the airspeed, if the airspeed is disabled.

The goals which may be given to the VCS include angle-of-attack, airspeed, altitude, vertical velocity, and g-force. The VCS causes the aircraft to meet these goals by controlling the control stick 44, rudder 46, and throttle 48 of the aircraft. Additional special items may be controlled also, such as the speedbrakes 50 found on some fighter aircraft.

In the preferred embodiment, the outputs of the VCS are used to manipulate the controls normally used by the pilot. The VCS actually directly manipulates the rudder 46, stick 44, and other pilot controls through actuator motors or other actuator means coupled thereto. Thus, for example, when the VCS increases the altitude of the aircraft, it moves the pilot's stick back. This causes the aircraft's flaps to be raised, exactly as if the pilot had pulled back on the stick. There is preferably no direct manipulation of the aircraft's control surfaces by the VCS; all controlling is done by manipulating the same aircraft controls as the pilot uses.

While it is possible to manipulate the control surfaces of the aircraft directly, the system described above has an important advantage over the use of direct control. Movement of the pilot's controls provides important feedback to the pilot. When the aircraft performs maneuvers, the normal controls move in a manner which is familiar to the pilot. If the control surfaces of the aircraft were moved without this type of feedback, the pilot would not be able to properly control the aircraft.

The stick and rudder controls are manipulated by attaching servo motors or other electric actuators to the normal controls, with these servos being under the control of the VCS. When the automated system is flying the aircraft, it has sole control of the aircraft's operations by manipulating these controls. The servos are passive when the pilot has control of the aircraft. Of course, in a totally automated aircraft, the VCS can drive the controlling surfaces of the aircraft directly.

It would be possible to have the VCS manipulate the control surfaces of the aircraft directly, and provide feedback to the pilot's controls. However, this method is not preferred because it would involve two sets of drivers for the aircraft's control surfaces, and would still require actuators for the stick and rudder. In addition, the preferred control method is more easily retrofit to existing aircraft.

The desired goals are given to the VCS by an intermediate level controller, the vehicle control expert system 53 (VCES). This controller determines a set of intermediate goals which must be met in order to perform a desired maneuver. This level of the control system corresponds roughly to a human pilot's learned skills. Trained pilots do not need to conciously think of all the intermediate steps which are needed to undertake a sophisticated maneuver; they merely decide which maneuver is to be performed, and the actual execution of the maneuver is an almost unconcious action. The VCES models this level of pilot behaviour.

A pilot expert system 54 (PES) equates approximately to the concious, decision-making processes undertaken by a human pilot. Decisions as to which maneuvers to perform are made at this level, as well as whether a maneuver should be aborted. Decisions concerning overall mission planning can be made by the PES.

The dividing line between each part of the overall control system is somewhat arbitrary. The precise dividing line will depend on the specifics of any particular implementation. In fact, it is not necessary to draw a hard line between the various parts of the system; some functions can be implemented which cross boundary lines. The division into levels is primarily a tool to assist the creator of a complete control system 40 in visualizing the interrelationship between various parts thereof.

The current aircraft parameters 56 are provided as needed to all levels of the system. These parameters are preferably sensed using the standard sensors already in place on the aircraft. These parameters indicate the current state of the aircraft, and include such information as pitch, airspeed, heading, g-force on the pilot, remaining fuel, altitude, status of weapon systems, and damage. Some parameters are not used by certain parts of the system. For example, the amount of fuel remaining is not necessary to the functioning of the VCS; it will attempt to succeed at its given goals regardless of the state of this parameter. This information is used by the PES, however, to determine whether a particular maneuver is advisable given the amount of fuel currently available.

The VCES determines the goals which must be given to the VCS in order to implement desired maneuvers. These are expressed as a series of intermediate goals which, when performed in the order specified by the VCES, cause the aircraft o perform the desired maneuver. The VCES is implemented as a series of commands and conditionals. The commands select certain parameters and assign desired values. These values are passed to the VCS as its goals. Parameter may be deselected, meaning that their values need not fall within certain values for some portion of the maneuver. The VCS can utilize these parameters as necessary to succeed in other goals. For example, if angle-of-attack is deselected for some maneuver, or portion of a maneuver, the VCS can change the angle of attack to any suitable valve according to its internal rules of operation. If the angle of attack is selected, the VCS must attempt to maintain it at the selected value.

The VCES also uses conditionals to perform maneuvers. A conditional is expressed as a desired goal which will be met at some time in the future. When a conditional is encountered in the steps of the VCES, it waits until the conditional is satisfied before continuing to the next step. For example, a conditional can be expressed as hold all values at their current state until the airspeed reaches a selected value. This is useful if a maneuver requires a certain minimum airspeed for its performance. The VCES will not cause the maneuver to begin until sufficient airspeed has been obtained.

Figure 3:
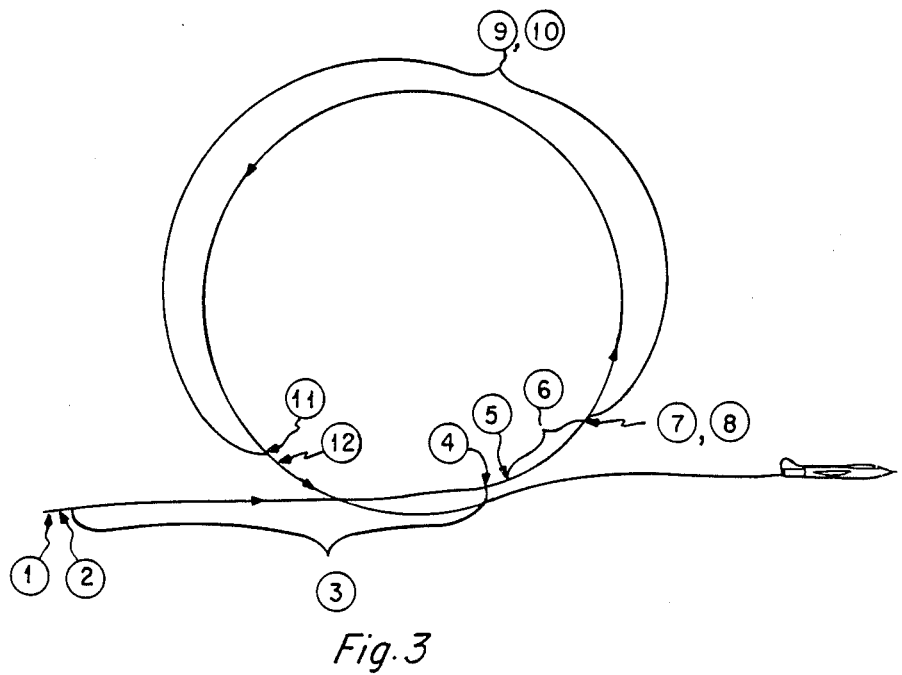
FIG. 3 illustrates a sequence of steps used to perform a loop maneuver.

FIG. 3 indicates intermediate goals and positions which are obtained during a simple loop maneuver. Table 1 shows a set of intermediate goals which can be used to cause this maneuver. The location within the loop where each goal is effectuated is marked in FIG. 3 with the corresponding number from Table 1. Note that the particular set of goals which can accomplish a loop will vary depending on the aircraft, and multiple possible sets of goals may be valid for a given aircraft. For example, a fighter aircraft could have several types of loops implemented by the VCES. These could correspond to, for example, a slow loop having minimum airspeed at the top, a fast loop with maximum g-forces within the tolerances of the average pilot, and an emergency tight loop which could cause the pilot to black out. The latter case would require that the control system be able to fly the aircraft unassisted after the loop.

The first three steps shown in Table 1 indicate that the first steps in performing a loop maneuver are to set the throttle (mil is short for military throttle setting, which is the maximum throttle setting short of using afterburners) and wait for the airspeed to reach 450 knots if it is not at least that high already. Once the airspeed reaches 450, the next step in the plan is performed.

TABLE 1

| | |
|---|---|
| 1 | Set throttle to mil |
| 2 | Set airspeed goal to 450 knots |
| 3 | Wait until airspeed goal is met |
| 4 | Set bank within tolerance (a few degrees) of horizontal |
| 5 | Set g-force goal to 5 g's |
| 6 | Wait until g-force goal met |
| 7 | Deselect g-force goal |
| 8 | Set angle-of-attack to 13 degrees |
| 9 | Maintain bank within tolerance |
| 10 | Wait until $-20$ degrees $<$ pitch $< -10$ degrees |

TABLE 1-continued

| | |
|---|---|
| 11 | Deselect angle-of-attack goal |
| 12 | Resume normal flight (return heading and altitude to original values) |

This plan for a loop simply waits until the airspeed reaches 450, but it is possible to perform other actions while waiting for the airspeed to come to the proper value. For example, the aircraft could be put into a shallow dive to increase airspeed, or could perform aileron rolls until the proper airspeed is reached.

Step 4 ensures that the wings of the aircraft are substantially level before the loop is attempted. The acceptable tolerance will vary between different types of aircraft and operating conditions, and can be, for example, 5 degrees.

Once the bank of the aircraft is within tolerance, the system sets a g-force goal of 5 g's. G-force is controlled by the VCS by rotating the aircraft around an axis parallel to the wings and passing through the center of gravity of the aircraft. This rotation is caused by raising the flaps on both wings by an equal amount. This causes the aircraft to begin the loop maneuver.

Once the g-force goal has been met (step 6), it is deselected in step 7. This means that the VCS will ignore g-force values, and will not attempt to control the g-force on the aircraft in any way. Step 8 sets the angle-of-attack to 13 degrees. This will cause the aircraft to continue through the loop. Step 9 indicates that the bank is continuously maintained within the original tolerance.

Concurrently with step 9, step 10 monitors the pitch of the aircraft as it changes throughout the course of the loop. When the pitch comes into the range between $-20$ and $-10$ degrees, the loop is nearly completed. A simple test for pitch greater than $-20$ degrees will not function correctly because the pitch of the aircraft will be greater than 0 for the entire first half of the loop. The test for the range shown ensures that it succeeds at the proper point in the loop.

Step 11 deselects the angle-of-attack goal when step 10 completes. The aircraft is now ready to come out of the loop, and step 12 causes the VCS to return the aircraft to its initial status. Depending on the desired results of the maneuver, airspeed may or may not be returned to its original value.

FIG. 3 illustrates the position and operation of the aircraft during the loop maneuver controlled by the plan shown in Table 1. Numbered positions on the path of the loop indicate the positions at which the various numbered steps in Table 1 operate. Most control functions are performed in a very short time compared to movement of the aircraft, while the waiting functions occur over extended periods of time.

The loop described above is an example of a very simple maneuver for an aircraft. It is comprised of a series of separately definable steps, each of which has a goal. Command steps pass new goals to the VCS, which in turn controls the behavior of the aircraft. The waiting steps monitor the current parameters of the aircraft, and allow the next step in the plan to proceed only after one or more conditions are met.

Other maneuvers are implemented in a similar manner. The steps which are necessary to perform the maneuver are broken down into intermediate goals. A plan is developed which contains commands and conditionals, in the manner illustrated in Table 1. Each plan contains all of the information necessary to control the VCS, which in turn controls the operation of the aircraft to perform the desired maneuvers.

The plans necessary to implement desired maneuvers can be obtained in several ways. Perhaps the most straightforward way is to query expert pilots and trainers on the techniques used to perform maneuvers. This can be done in a way which approximates the learning process of a human pilot. For example, when a pilot learns to perform a loop, he first studies the necessary intermediate steps and performs them slowly by following a plan similar to that set forth in Table 1. As the pilot improves his skill, it no longer becomes necessary to conciously consider each step of the maneuver; the pilot simply performs a loop. The pilot has learned to perform the separate steps on a subconcious level, and this is the level of performance modelled by the VCES.

It is also possible to obtain plans by observing what actually happens when a certain maneuver is executed. A running log is kept of the operating parameters of an aircraft while the maneuver is performed several times. These data are then used to determine a plan which can control the aircraft to perform that maneuver. It will usually be necessary to modify the plan several times until the maneuver is performed satisfactory. This is preferably done using a simulator for the aircraft in question. Although general plans can be used as a starting point to implement a maneuver for several different aircraft, differing flight characteristics of different aircraft will necessitate that most plans be custom tuned for each aircraft type.

The VCS is seen as the low level controller for aircraft functions. The VCES contains all of the information necessary to perform any maneuver in its knowledge command input or voice commands entered through a speech recognition device as known in the art. Maneuvers can also be instigated by the PES operating independently.

In much the same manner as the VCS operates much as a pilot's muscles, and the VCES operates much as the trained reflexes of the pilot, the PES operates as the pilot's concious thought processes. It is implemented as an expert system having a field of expertise relating to flight planning and control. The PES can make decisions related to short term actions of the aircraft, and relate them to overall mission goals.

The PES compares desired actions with any restrictions it knows about. For example, it will not initiate a maneuver which causes a loss of altitude which is greater than the aircraft's current height above the ground. If it is desired to perform a series of maneuvers, the PES can use standard decision-making techniques to determine the most efficient order in which to execute those maneuvers which is consistant with all known airspace restrictions, fuel on board the aircraft, etc. The PES can incorporate any navigational or other global information which is supplied.

The PES can construct new maneuvers from currently known ones. The PES receives all current aircraft parameters in parallel with the VCES and VCS. Changes can be made during ongoing maneuvers. For example, the PES can monitor the pitch of the aircraft during a loop maneuver. When the pitch reaches 180 degrees (upside down), the PES can cancel the loop maneuver and initiate a half aileron-roll, which is a spin about the aircraft's long axis. This combination of partial maneuvers results in another maneuver known as an Immelmann. This maneuver results in the aircraft travelling on a heading opposite to that at which it entered the aborted loop, and at a higher altitude. Reversing the order of the two partial maneuvers, a half aileron roll followed by the second half of a loop, results in a maneuver known as a split-S. Ongoing maneuvers can be aborted at any time by the PES or a pilot. Any number of plans and partial plans can be concatenated to produce an overall flight plan, which can be modified according to current conditions.

The use of experts to model the behavior of a human pilot as described above greatly increases the usefulness of this system. The course of training for the expert vehicle control system can be modelled after the training regimen used for people. In the case of aircraft piloting, thousands of man-years have gone into developing training courses. Well defined training stages are used to train a novice to be an expert pilot. During the course of the training, well defined tests are used to determine whether a pilot has successfully passed each stage of training.

The expertise used to develop and test human pilots is used in the expert vehicle control system. All maneuvers performed by pilots can be broken down into a series of identifiable steps. In fact, this is done to initially teach maneuvers to pilots. After extensive practice, the pilot performs the maneuvers without conciously considering each step. In an analogous manner, the steps used in various maneuvers are entered into the VCES knowledge base. The VCES then controls the aircraft by successively performing each step of the maneuvers. As described above, the actions of the VCES correspond roughly to the subconcious, trained reflexes of a trained pilot.

The testing procedure for pilots can be used to test the suitability of a complete control system. A human pilot is given one or more check rides with an instructor to test his ability in an aircraft. These check rides consist generally of a flight wherein the pilot is given a list of maneuvers to perform, typically in an order determined by the pilot and under certain airspace and fuel restrictions, and perhaps with unexpected situations being presented during the testing. Well defined criteria are applied to the pilot's performance to determine whether the check ride is passed. The same test can be given to the expert vehicle control system. An instructor accompanies the control system piloted aircraft on a check ride, and applies the same criteria to its performance as is applied to a human pilot. In this manner, the performance of the expert control system is easily judged using well established criteria.

The PES, VCES, and VCS are preferably implemented as programs on a digital computer onboard the aircraft, or on a computer system linked to an appropriate aircraft simulator.

TECHNICAL ADVANTAGES

The system described above provides a sophisticated automatic expert piloting tool for operating aircraft. It provides feedback to a pilot by manipulating the controls used by the pilot. It is capable of operating an aircraft without supervision, and so can be used to pilot unmanned vehicles or to complement and assist pilots of standard aircraft. It is suitable for use in a military or commercial environment.

Because the system operates by mimicking the learning processes of a human pilot, it can be tested in the same manner as pilots, and "trained" in a similar manner. When the system is completed, it passes testing using the same criteria applied to human pilots. This provides straightforward and complete testing of the system in any given aircraft.

It will be apparent to those skilled in the art that numerous modifications can be made to the system described above. At a minimum, maneuver plans and decision functions will need to be changed when the system is used with different aircraft. The flight characteristics of different characteristics vary greatly, and the system must be optimized for each situation in which it is implemented. The boundary lines between the parts of the system, the VCS, VCES, and PES, may be changed, and in fact may be blurred to the point that the system appears as a single, uniform entity. It is expected that the use of predetermined plans to implement complex maneuvers would be retained.

The described system can also be used to control vehicles other than aircraft. Any vehicle can be controlled if it (1) has human usable controls which can be modified to be controllable by the VCS, (2) has reasonably well understood (or understandable) responses to manipulation of the controls, and (3) performs maneuvers or tasks which can be broken down into a series of relatively simple intermediate goals. Although aircraft control is perhaps one of the simplest applications of the described system, it can also be used to control surface vehicles, submarines, and spacecraft.

The present invention has been described with reference to a preferred embodiment, and variations and modifications thereto fall within the scope of the invention as defined by the claims.

What is claimed is:

1. A control system for a vehicle, comprising:
    vehicle controls for manipulating controllable functions of the vehicle;
    a first control system coupled to said vehicle controls, said first control system adapted to manipulate the controllable functions to achieve predetermined goals, said predetermined goals being selected vehicle operating parameters;
    a second control system coupled to said first control system and adapted for controlling said first control system by providing a series of goals to achieve predetermined maneuvers, wherein a series of consecutive goals defines a maneuver and a series of consecutive maneuvers defines a mission plan to be executed by the vehicle; and
    a third control system coupled to said second control system, wherein said third control system includes a mission planner, and wherein said third control system controls said second control system and is adapted for providing a series of consecutive maneuvers to said second control system in accordance with a mission plan.

2. The system of claim 1, wherein said third control system monitors selected vehicle parameters, and wherein ongoing maneuvers can be interrupted at any time to initiate new maneuvers.

3. The system of claim 1, wherein the controlled vehicle is an aircraft.

4. The system of claim 3, wherein said first control system manipulates a control stick, rudder, and throttle of the aircraft.

5. The system of claim 1, wherein the vehicle is unmanned.

6. The system of claim 1, wherein said second control system monitors selected vehicle parameters, and wherein ongoing goals can be interrupted at any time to initiate new goals.

7. The system of claim 1, wherein at least one of the goals provided to said second control system comprises a waiting step wherein no further goals are provided to said first control system until selected vehicle parameters corresponding to previous goals reach selected values.

8. The system of claim 1, wherein said first control system is adapted to monitor selected vehicle operating parameters.

9. A control system for an aircraft, comprising:
    a first controller coupled to aircraft controls for manipulating the aircraft controls, wherein said first controller is adapted to manipulate the aircraft controls to achieve predetermined goals, said predetermined goals being selected parameters of the aircraft;
    a second controller coupled to said first controller for controlling said first controller by supplying thereto a series of goals to be achieved, wherein selected consecutive groups of goals define standard aircraft maneuvers; and
    a third controller coupled to said second controller for controlling said second controller by selecting maneuvers to be performed in accordance with an overall mission plan;
    wherein said second controller can change the goal supplied to said first controller without regard to whether a current goal has been achieved, wherein said third controller can change a selected maneuver without regard to whether a current maneuver has been completed, and wherein said third controller can supply goals directly to said first controller.

10. The control system of claim 9, wherein the control system operates on an aircraft piloted by a person, and wherein said first controller is coupled to pilot manipulable controls through servo mechanisms, and wherein said first controller manipulates the aircraft controls by actuating the pilot manipulable controls with the servo mechanisms.

11. The system of claim 9, wherein said first control system is adapted to monitor selected vehicle operating parameters.

12. A vehicle control system, comprising:
    vehicle controls for manipulating controllable functions of the vehicle;
    a first controller coupled to said vehicle controls and adapted to manipulate the controllable functions to achieve predetermined goals, said predetermined goals being selected vehicle operating parameters.
    a second controller coupled to said first controller and adapted for controlling said first controller by providing a series of goals to achieve predetermined maneuvers, wherein a series of consecutive goals defines a maneuver to be executed by the vehicle; and
    a third controller coupled to said second controller for controlling said second controller by selecting maneuvers to be performed in accordance with known conditions, said known conditions being current vehicle operating parameters.

13. The vehicle control system of claim 12, wherein said third controller monitors selected vehicle parameters, and wherein ongoing maneuvers can be interrupted at any time to initiate new maneuvers.

14. The vehicle control system of claim 12, wherein the second controller can change the current goal supplied to said first controller regardless of whether any such current goals have been achieved.

15. The vehicle control system of claim 12, wherein said third controller can supply goals directly to said first controller.

16. The vehicle control system of claim 12, wherein the vehicle is unmanned.

17. The vehicle control system of claim 12, wherein the first controller is adapted to monitor selected vehicle operating parameters.

18. The vehicle control system of claim 12, wherein the vehicle is an aircraft.

19. The vehicle control system of claim 18, wherein the first controller is adapted to manipulate a control stick, rudder and throttle of the aircraft.

20. The vehicle control system of claim 12, wherein at least one of the goals provided to said second controller comprises a waiting step wherein no further goals are provided to said first controller until selected vehicle parameters corresponding to previous goals reach selected values.

21. The vehicle control system of claim 12, wherein said known conditions include a mission plan.

22. A control system for an aircraft, comprising:
aircraft controls for manipulating controllable functions of the aircraft;
a first control system coupled to said aircraft controls and adapted to manipulate said aircraft controls to achieve predetermined goals, said predetermined goals being selected parameters of the aircraft;
a second control system coupled to said first control system for controlling said first control system by supplying thereto a series of predetermined goals to be achieved, wherein selected consecutive groups of goals define standard aircraft maneuvers; and
a third control system coupled to said second control system for controlling said second control system by selecting maneuvers to be performed in accordance with known conditions, said known conditions being mission plans and current vehicle operating parameters.

23. The control system of claim 22, wherein the aircraft is unmanned.

24. The control system of claim 22, wherein said third control system monitors selected vehicle parameters, and wherein ongoing maneuvers can be interrupted at any time to initiate new maneuvers.

25. The control system of claim 22, wherein the second control system can change the current goal supplied to said first control system regardless of whether any such current goals have been achieved.

26. The control system of claim 22, wherein the first control system is adapted to manipulate pilot manipulable controls, said pilot manipulable controls including a control stick, rudder and throttle of the aircraft.

27. The control system of claim 26, wherein the control system operates on an aircraft piloted by a person, and wherein said first controller is coupled to said pilot manipulable controls through servo mechanisms and wherein said first controller manipulates the aircraft controls by actuating the pilot manipulable controls with the servo mechanisms.

28. The control system of claim 22, wherein said third control system can supply goals directly to said first control system.

29. The control system of claim 22, wherein at least one of the goals provided to said second control system comprises a waiting step wherein no further goals are provided to said first control system until selected vehicle parameters corresponding to previous goals reach selected values.

* * * * *